United States Patent [19]
Mette

[11] 3,828,317
[45] Aug. 6, 1974

[54] CLEANING PROCESS SEQUENCE CONTROLLER

[75] Inventor: Klaus-Hermann Mette, Scarborough, Ontario, Canada

[73] Assignee: Graphico Precision Works Ltd.

[22] Filed: Feb. 28, 1972

[21] Appl. No.: 229,864

[52] U.S. Cl. .............................. 340/172.5, 222/76
[51] Int. Cl. ........................ G05b 15/00, B67d 5/06
[58] Field of Search ......... 340/172.5; 235/150, 151; 222/76; 214/11 C

[56] References Cited
UNITED STATES PATENTS
3,498,501    3/1970   Robbins et al................... 222/76 X

*Primary Examiner*—Raulfe B. Zache
*Attorney, Agent, or Firm*—George A. Rolston

[57] ABSTRACT

A process control programmer for use in the programming of selective process controls for selecting different processing options such as for example in car wash installations of the type equipped to both wash cars, and also apply a spray wax treatment or a hot wax treatment or the like and having a plurality of process selector signal generating means for generating a signal indicating the particular process selected, process selection information storage circuit means responsive to said signals for receiving and storing said information concerning the particular process selected, information signal transfer means for transferring said stored information from one said storage circuit means to another, and process operation signal means responsive to information stored in one said information storage circuit means to initiate operation of a selected process on a predetermined car.

11 Claims, 8 Drawing Figures

CLEANING PROCESS SEQUENCE CONTROLLER

The present invention relates to apparatus for selectively controlling the processing sequence of a multi-stage process, such as a multi-stage cleaning process, and is of particular interest in relation to the automatic washing and waxing of automobiles.

BACKGROUND OF THE INVENTION

The washing and waxing of automobiles in automatic car wash installations and the like is usually carried on by attaching an automobile to a continuously moving conveyor system, and gradually moving the automobile through a series of washing and waxing stations arranged around the conveyor line.

At each of these washing and waxing stations, various automatic washing and waxing steps are carried out. In the majority of car washes, it is now the practice to provide the individual customer with a series of options. Either he can have the car simply washed, or he can have it washed and waxed with hot wax or he can have it washed and waxed with spray wax.

Obviously, it is possible that in some car wash installations there might be a greater number of options, and alternatively it is certainly true that in some simpler forms of installations there are fewer options, that is to say, either the customer can have it washed and waxed or simply washed and that is all.

If the individual cars arrived at the car wash installation at reasonably timed intervals, the selection of the different options for each car would of course present no problem. However, it is a fact that the cars will usually arrive at the car wash station and find ten or twenty cars in line ahead of them, and the employees at car wash are working as fast as they can to process the cars and mistakes in fact often occur whereby a car owner will find that he has his car washed and waxed when he only wanted it washed and vice versa. This causes dissatisfaction for the customers, and causes a great deal of waste of time and troublesome delays in the operation of the car wash itself.

Accordingly, it is quite desirable to attempt to provide some form of continuous process sequence control for a car wash whereby the car owner can state his selection to the supervisor of the car wash who will then program the process controller in such a way that when that particular customers car reaches the particular station in the car wash it is treated correctly without further intervention from any of the personnel in the car wash.

BRIEF SUMMARY OF THE INVENTION

The present invention therefore seeks to provide a selective controller for a multi-stage process such as an automobile cleaning process having a plurality of different processing stations, the controller comprising a plurality of process selectors generating process information signals, a plurality of information storage circuit means selectively responsive to said process information signals for receiving and storing information concerning the processes selected, information transfer means for transferring said stored information from one said storage circuit means to another, and process operation signal means responsive to information stored in one said information storage circuit means to initiate operation of selected processes.

More particularly the invention seeks to provide a process control having the foregoing advantages which is further provided with information input means in the form of push buttons for each of the processes available, and indicator lights responsive to said push buttons showing which processes have been selected.

More particularly, it is an objective of the present invention to provide a process control having the foregoing advantages which is adapted to store process information for a plurality of different selected combinations of processes, and which is provided with indicator lights showing each of said selected combinations of processes in the sequence in which they have been selected.

More particularly, it is an objective of the present invention to provide a process control having the foregoing advantages which is provided with reset means enabling errors to be cancelled from the information storage means, and the information reset correctly.

It is a further and related objective of the invention to provide in association with the foregoing invention, information storage circuitry, and stored information transfer circuitry, adapted to achieve the foregoing objectives.

The foregoing and other objectives will become apparent from the following description of a preferred embodiment which is given here with reference to the following drawings in which like reference devices refer to like parts thereof throughout the various views and diagrams.

DETAILED DESCRIPTION OF THE PREFERRED EMBODIMENT

Figure 1:
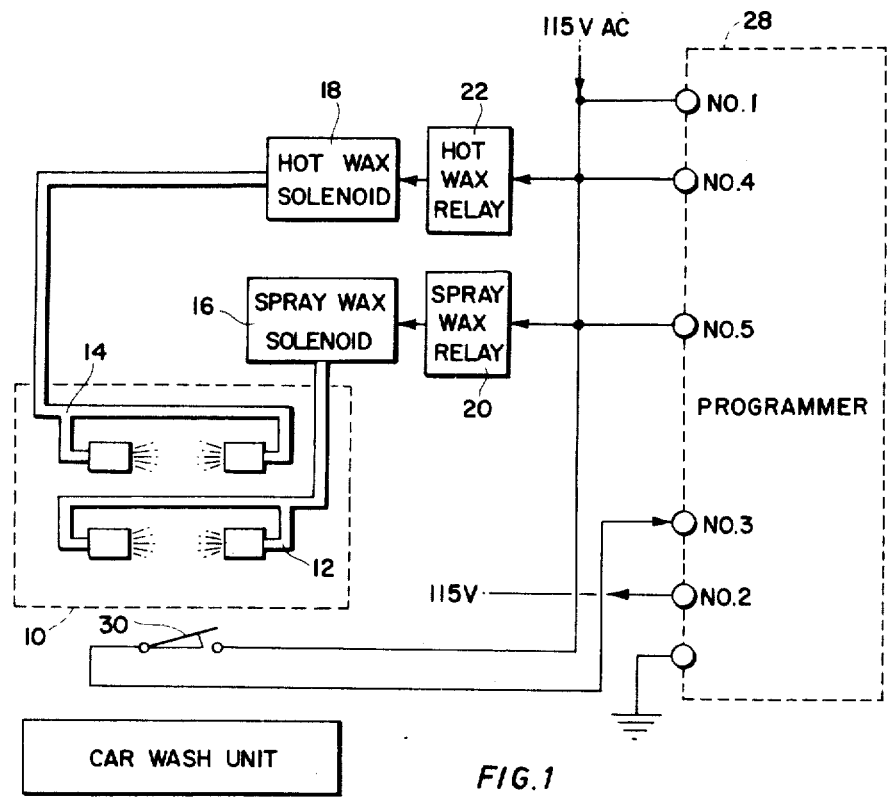
FIG. 1 is a schematic plan view of a car wash installation showing the separate processing stages.

Referring now to FIG. 1, it will be seen that this is simply a schematic diagram showing a car wash unit shown simply as the box 10, which may comprise any suitable car washing facilities (not shown), and may in addition comprise systems for applying two different kinds of wax to a washed automobile. One such system will be a spray wax system shown generally as 12, and the other may be a hot wax applying system shown generally as 14. In each case the details of the wax applying systems are irrelevant for the purposes of the present description, and are accordingly omitted. However, it is sufficient to say that they are both operable by solenoid operated valve means (not shown) which are operated by a respective spray wax solenoid 16 and hot wax solenoid 18. The solenoids 16 and 18 are inturn operated by a respective spray wax relay 20, and hot wax relay 22, which are inturn provided with coils 24 and 26.

Figure 2:
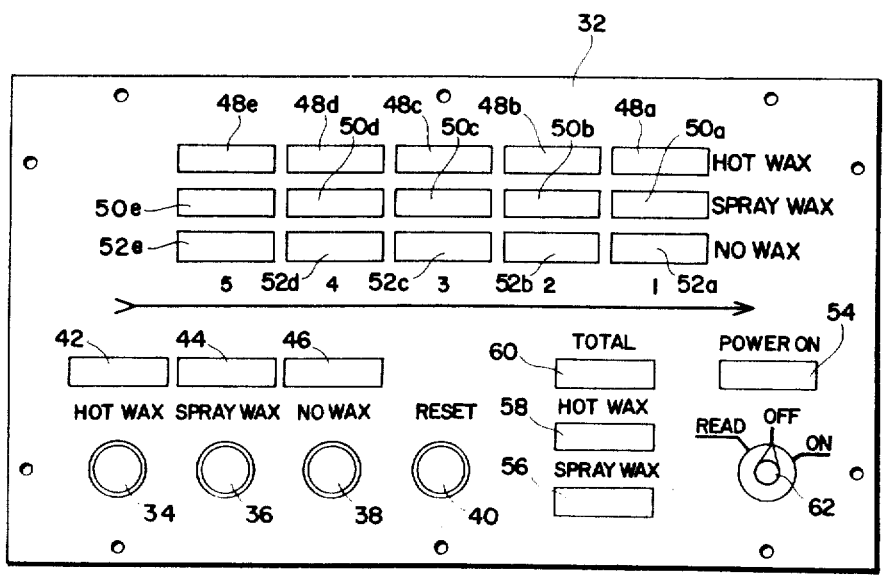
FIG. 2 is a front elevational view of the control panel of the control apparatus according to the invention.

It will of course be understood that the invention is directed to means for programming the operation of the solenoids 16 and 18, by means of their relays 20 and 22 and coils 24 and 26, and such programmer means are shown generally in FIG. 1 by the box 28. Any suitable means for sensing the progression of cars through the car wash unit 10 may be provided such as the micro-switch 30 which is suitably positioned in the path of an automobile entering the car wash unit 10 so as to be operated by the wheels of such car as the same enters the car wash unit. The programmer 28 is responsive to operation of the micro-switch 30 in a manner to be described below and deliver the appropriate signal, signifying either hot wax, spray wax or no wax to the coils 24 and 26 thereby activating or deactivating such coils 24 and 26, and producing the result desired by the driver of the car entering the car wash unit 10 at that time Before describing the details of the programmer circuit, reference will be made to FIG. 2. This illustrates the control panel 32 of the programmer 28. The control panel 32 is provided with four push buttons namely the hot wax button 34, the spray wax button 36, the no wax button 38 and the reset button 40. Respective selection lights 42, 44 and 46 are provided above the hot wax, spray wax and no wax buttons which are designed to flash momentarily when the appropriate button is operated. The particular control panel 32 illustrated in FIG. 2 is designed to permit information concerning the washing and waxing of up to five automobiles in all to be received and stored. It is assumed that for purposes of this car wash installation, the drivers of any automobiles in excess of five will not yet have placed their orders with the personnel in charge. Obviously however, it would be possible according to the practice of the invention to provide information storage facilities for more or less than five automobiles, the example shown in FIG. 2 being merely for the sake of simplicity and without limitation.

Thus according to the invention it will be seen that the information recorded for any particular car may be either a treatment with hot wax, spray wax or no wax at all. In order to provide a visual indication of the processing treatment selected for each of the next five cars in line, the panel 32 is provided with a bank of five hot wax indication lights 48, and with a bank of five spray wax indication lights 50, and a bank of five no wax indication lights 52. In addition, the panel 32 may be provided with a power indication light 54 indicating that the power is on, and three separate counter mechanisms namely a spray wax counter 56, a hot wax counter 58, and a total counter 60. Preferably, each of the counter mechanisms is of such a type that, unless illuminated the figures are invisible. In this way, the information available from such figures is maintained confidential, until read by authorized personnel. An on/off switch 62 is provided, having an additional position in which it will provide for illumination of the counters 56, 58 and 60.

The control panel 32 is preferably mounted close to or adjacent the entrance to the car wash unit 10, or a little distance from it so that the car wash personnel can request each driver inturn to make his selection, and upon the selection being made, the car wash operator can then simply press the appropriate button. Upon the button being pressed by the operator, circuits within programmer 28, will cause the appropriate indicator light to be illuminated indicating the selection of a particular washing or waxing program. If the wrong program should inadvertently be selected, then the individual can simply press the reset button 40 and cancel out the last selection and insert the correct selection.

By means of the circuit to be described below, the information selected for car numbers 2, 3, 4 and 5 will automatically be moved up one number after car number 1 has been processed through the car wash unit 10. Thus car number 2 will become car number 1 and so on. The information selected for car number 2, will, upon movement of car number 2 to the position of car number 1, will automatically be transferred into the appropriate selection for car number 1 and so on down the line. The individual in charge of the car wash will then go to the new car number 5 and invite the driver to make his selection and press the appropriate button afterwhich the selected program will then appear illuminated in respect of car number 5.

As the cars are processed through the car wash unit 10, the counter mechanisms are automatically operated, indicating the appropriate program, so that at the end of the day the car wash operator has an accurate count of the total number of cars processed in accordance with each particular program.

Figure 3A:
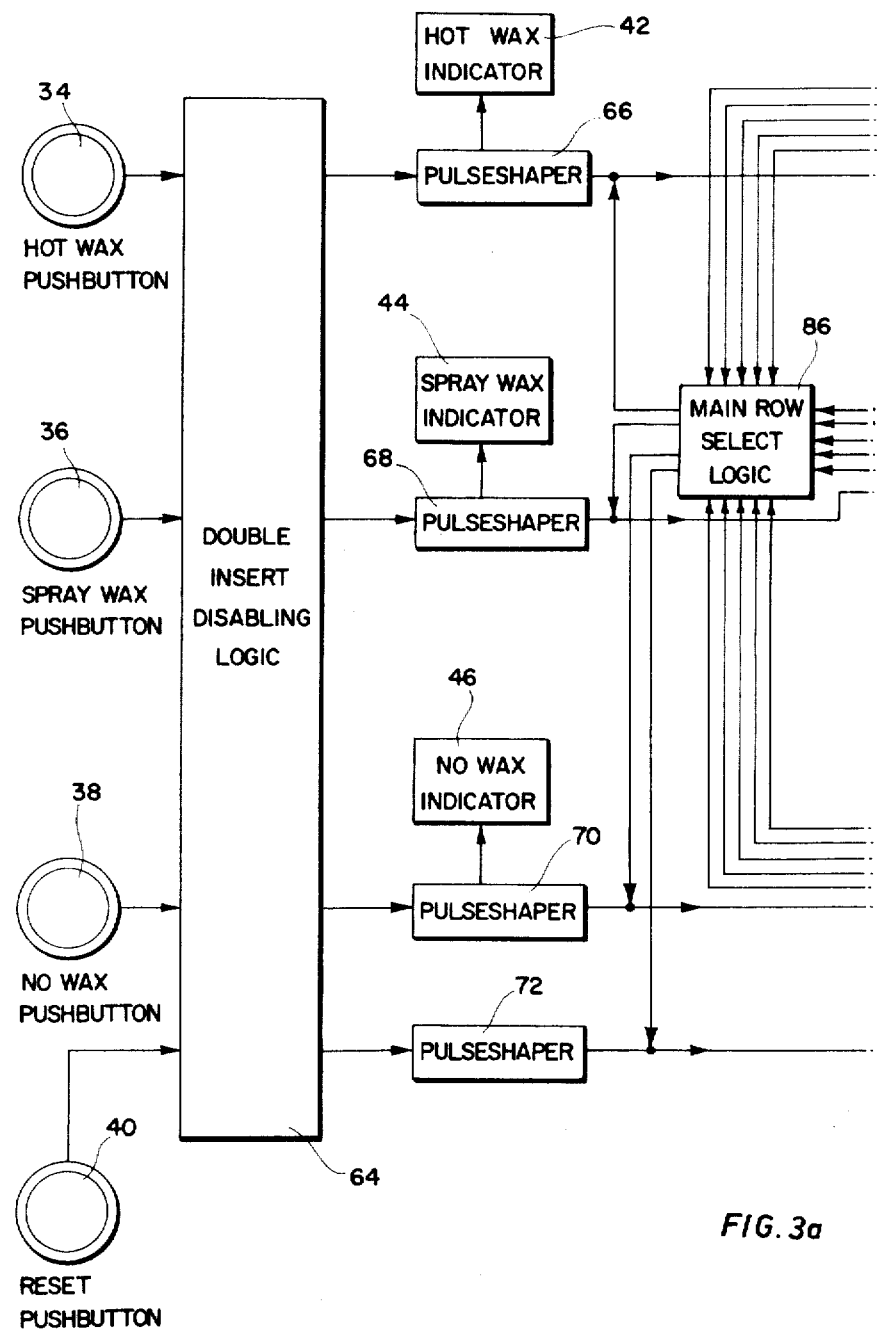
FIGS. 3A and 3B together show the schematic block circuit diagram of the process controller.
Figure 3B:
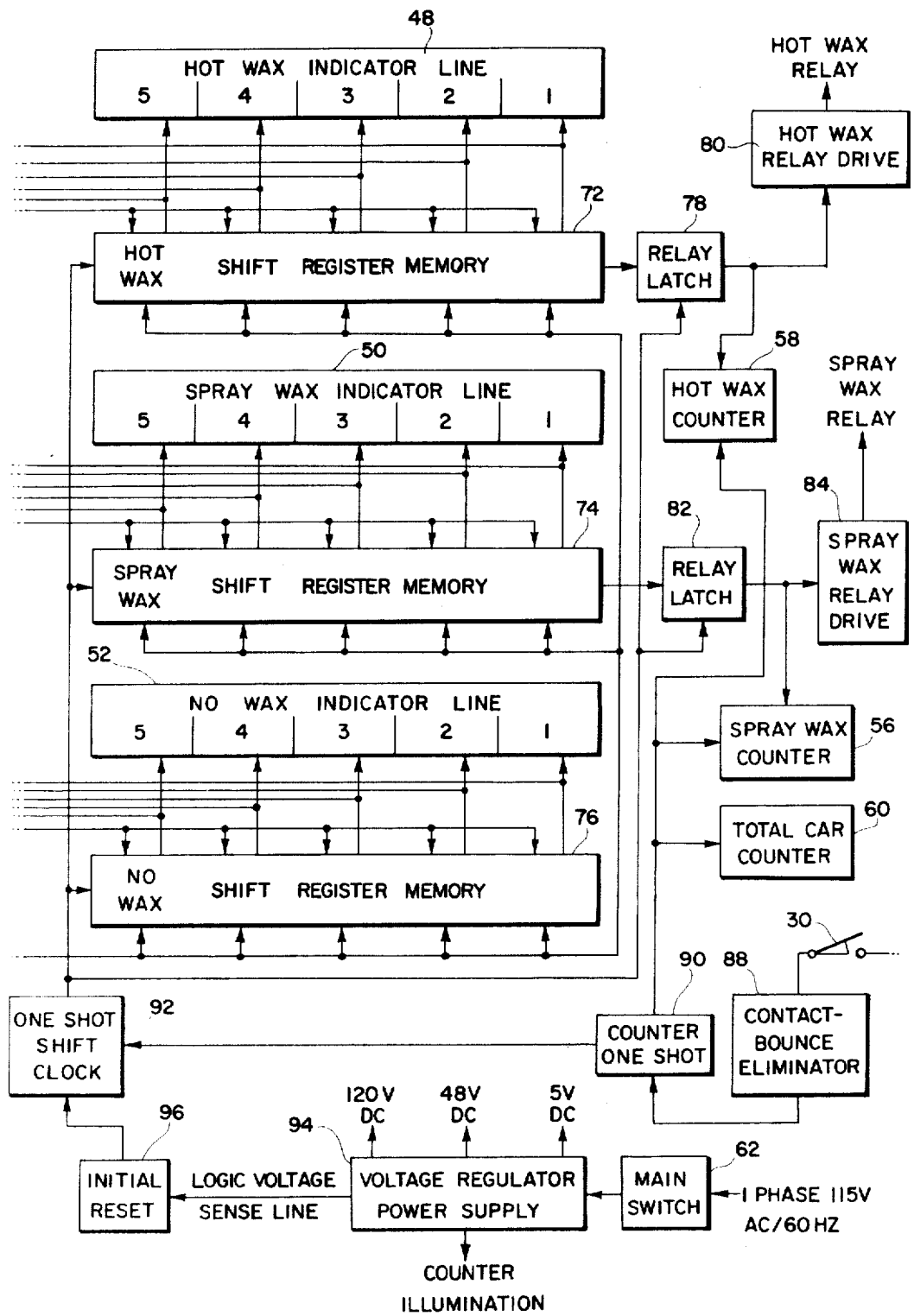

In order to provide these various functions, the invention provides for information recordal circuits and information storage circuits and transfer circuits substantially in accordance with the general block circuit diagrams of FIGS. 3A and 3B. It will be understood that FIGS. 3A and 3B must be read together, being simply two halves of the overall block circuit diagram of the programmer according to the invention.

Figure 4A:
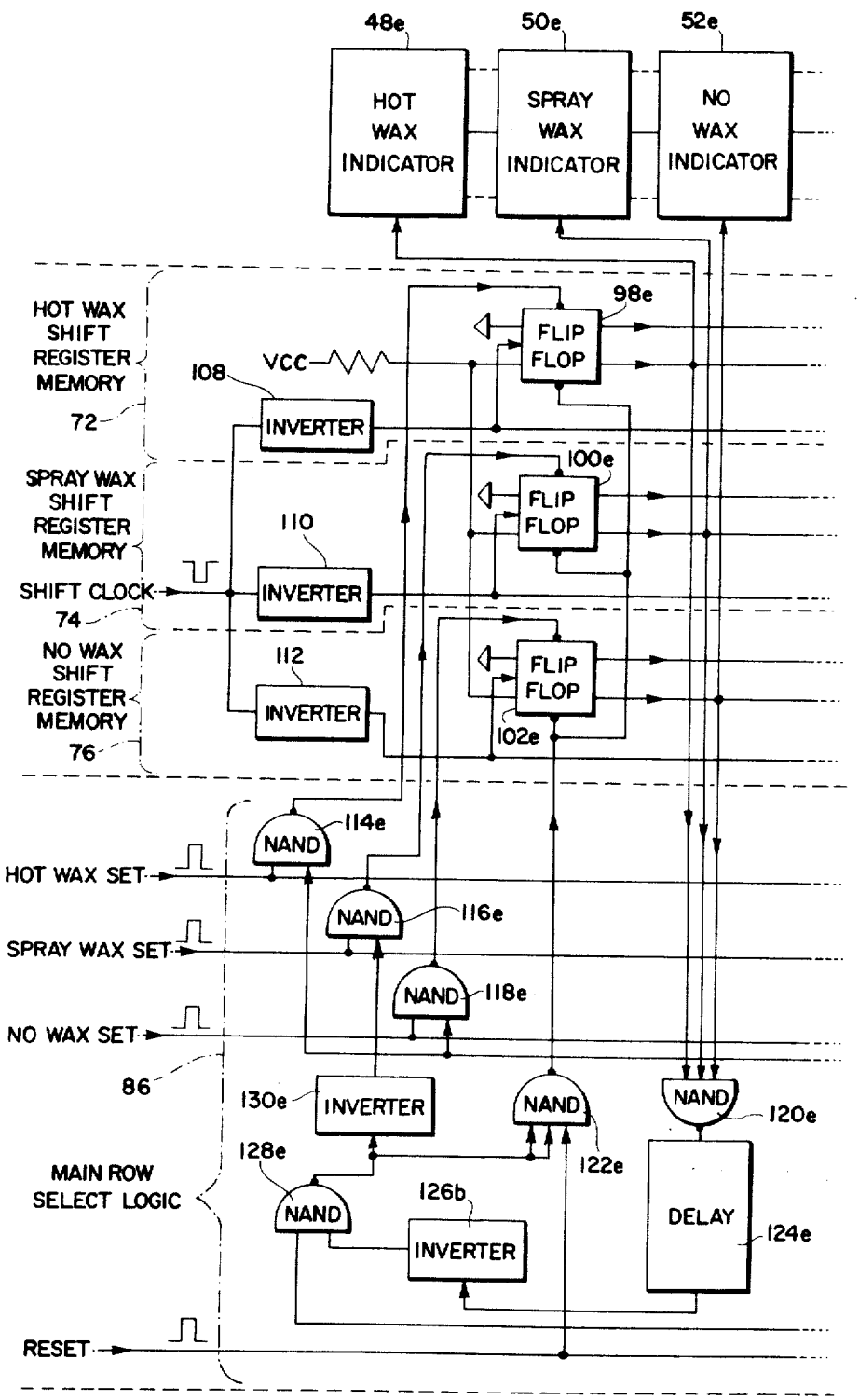
FIGS. 4A and 4B are block circuit diagrams of the information storage and transfer circuit means of the process controller.

Referring now to FIG. 3A, it will be seen that the four buttons 34, 36, 38 and 40 are all connected in circuit through a double insert disabling logic circuit referenced generally as 64, the function of which is to permit a signal from one button only to be passed therethrough, and which inactivates the remaining three buttons for a predetermined delay period in a manner to be described below. The disabling circuit 64 is inturn connected through separate pulse shaper circuits 66, 68, 70 and 72, the function of which is to provide the signal pulses for activation of the information recordal and transfer circuits. The respective pulse shaper circuit 66, 68 and 70 are connected to the respective selector lights 42, 44 and 46 shown on the control panel 32, to provide a brief flash in response to operation of the respective button. The pulse shapers 66, 68 and 70 are inturn connected to respective memory banks comprising the hot wax shift register memory bank 72, the spray wax shift register memory bank 74 and the no wax shift register memory bank 76. The pulse shapers shown in more detail in FIG. 5, provide an information pulse of predetermined duration to their respective memory banks, upon activation of the respective push buttons 34, 36 or 38. The respective memory banks 72, 74 and 76 are described in more detail in connection with FIGS. 4A and 4B. It will of course be understood that each of memory banks 72, 74 and 76 is comprised of separate information storage means for each of the total number of cars which are intended to be programmed into the programmer 28. As stated above, in the case of the present example, although without any limitation, the programmer 28 is designed to be programmed for up to five cars, and there are therefore five separate signal recording units in each of the memory banks 72, 74 and 76. Obviously, if it was required to store information for a greater number of cars then such number of information storage units would obviously be increased in each such bank.

Each of the information storage units in each of the memory banks 72, 74 and 76 is itself connected directly to a respective one of the appropriate banks of indicator lights 48, 50 or 52, as shown in FIG. 3B, whereby upon an information signal being recorded in any one of the information storage units, the respective indicator light in the respective bank of lights 48, 50 or 52 will be illuminated.

The hot wax memory bank 72 is further connected through a relay latch 78 to the hot wax counter 58, and the hot wax relay drive 80. The hot wax relay drive 80 is inturn connected to the hot wax relay, and coil 22, 26 as shown in FIG. 1.

The spray wax memory bank 74 is similarly connected to a relay latch 82 which is inturn connected to the spray wax counter 56, and the spray wax relay drive 84. The relay drive 84 is inturn connected to the spray wax relay and coil 20, 24 as shown in FIG. 1.

It will of course be understood that there is is no equivalent relay latch and associated circuits connected to the no wax memory bank 76, since none is required.

Each of the information recording units in each of the memory banks 72, 74, and 76 is further connected to a main row select logic circuit 86, the function of which is to ensure that a signal pulse from one of pulse shapers 66, 68 or 70 is recorded on the correct information storage unit in the respective memory bank 72, 74 and 76 in a manner to be described below.

The micro-switch 30, which as stated in connection with FIG. 1 is located at the entrance to the car wash unit, for activation by the wheels of the automobile entering the car wash unit is connected to a contact bounce eliminator 88, which ensures that only one signal per car is delivered by the micro-switch 30, and is then connected to a one shot pulse generator 90 which provides a trigger pulse for operation of the total car counter 60, and the appropriate one of counters 56 and 58, dependant upon whether the appropriate information signal is stored in the memory bank 74 or 72. The pulse generator 90 is inturn connected to another pulse generator 92 which delivers a "clock" pulse of predetermined shape, and is connected to each of the memory banks 72, 74 and 76, and also to the relay latches 78 and 82. The clock pulse is provided by pulse generator 92 operates to shift the information stored in the respective information storage unit to the next adjacent information storage unit, and simultaneously triggers the operation of the appropriate relay latch 78 or 82 to permit operation of the appropriate relay drive 80 or 84.

Power at the standard line voltage is supplied to the main switch 62, which inturn is connected directly to the voltage regulator power supply 94, which is inturn adapted to supply power for illumination of the counters 56, 58 and 60, and also supplies power at three different levels for operation of the various relays, the details of which are omitted for the sake of clarity, and further supplies power at the appropriate voltage for the operation of the logic portions of the programmer comprising the memory banks, the main row select logic and the double insert disabling logic circuits described in general above. The voltage regulator 94 is connected through an initial reset circuit 96 to the clock pulse generator 92, the purpose of the initial reset circuit 96 being to ensure that upon switching on of the power at the main switch 62 an initial series of reset pulses are initiated which cancel out any information signals which may be registered anywhere in any of the memory banks, and establish them in a condition ready to receive fresh information signals.

The memory bank circuits, and the main row select logic circuits will now be described with reference to FIGS. 4A and 4B. It will be understood that, as in the case of FIGS. 3A and 3B, FIGS. 4A and 4B must be read together side by side with one another, being simply two halves of the overall circuit diagram.

Thus it will be seen that the memory bank circuits are shown with the blocks representing the memory banks 72, 74 and 76, being outlined in phantom, and bearing the same reference numerals 72, and 74 and 76 respectively. Each of the three blocks is essentially similar, and comprises a plurality of separate memory units, referred to above as information storage units, which are known in the trade as "flip flops." Thus the memory banks comprising the hot wax shift register memory 72 comprises successive flip flops 98A, 98B, up to 98E, totalling five in all, there being one for each of the five hot wax indicator lights 48 shown in FIG. 2. It will be understood that the flip flops 98C and 98D have been deliberately omitted from this illustration for the sake of clarity, these units, and their associated circuits being identical to the flip flops 98A, 98B and 98E, and requiring no further discussion.

The memory bank comprising the spray wax shift register memory 74 is similarly provided with a plurality of flip flops 100A, 100B, up to 100E, and the memory bank comprising the no wax shift register memory 76 is also provided with a series of flip flops 102A, 102B up to 102E.

Obviously, if process information in relation to more than five cars is required to be stored in the memory banks, then the memory banks will comprise a greater number of flip flops, the number five having been selected merely for the sake of example. Each group of flip flops 98A, 100A, 102A or B or C, etc., thus stores information for one car only.

The hot wax and spray wax memory banks 72 and 74 are further provided with additional flip flops 104 and 106 for purposes to be described.

Each of the flip flops in the banks 72, 74 and 76 are provided with seven separate terminals, in accordance with the design and operation of typical flip flops as known in the art, these terminals comprising four information transfer terminals, namely terminals Z, Y, X and W, and information input terminal V, a control terminal U, and the information shift terminal T.

It will be noted that in the case of the flip flops 98, 100 and 102, the information transfer terminals Y and Z of one flip flop are connected with the information transfer terminals X and Y of the next adjacent flip flop, whereby information voltages at the X, W terminals of one flip flop for example, flip flop 98B are immediately transferred to the Z, Y terminals of flip flop 98A. The information input terminal Z, by circuits described below, is adapted to receive an information signal, and impress a predetermined voltage difference across the transfer terminals X, W of its respective flip flop. The control terminal U is responsive to a predetermined voltage difference occurring at the terminals X, W and controls the ability of the flip flop to receive further information, dependent upon the voltage difference between terminals X, W. The shift terminal T, is connected by circuits to be described below to receive a shift pulse signal, whereupon information occurring as a voltage difference across the terminals Y, Z is immediately transferred to the terminals X, W. This is somewhat of an over simplification of the operation of a standard flip flop circuit as known in the art, but it is believed that further description is superfluous. Circuit components of this type are well known in the art and operate according to well understood principles which do not require further discussion. The elementary function of the flip flop is to receive a signal information pulse at terminal V, which then produces a predetermined voltage difference at the terminals X, W. The voltage difference at X, W, of one flip flop for example 98B is then directly transmitted to the terminals Y, Z of the next adjacent flip flop, for example 98A. Upon receipt of a triggering signal pulse, known in the art, as a "clock" pulse at the terminal T of the flip flop 98A, the voltage difference across the terminal Y, Z is then communicated to the terminals X, W of the flip flop 98A, and thus to the terminals Y, Z of the next adjacent flip flop 104, which are in direct connection there with as shown in FIG. 4B.

In this way, information may be stored indefinitely on the flip flop at the terminals Y, Z, and may be shifted to the next adjacent flip flop by receipt of a clock pulse at the terminal T.

The function of the terminal U of the flip flop is to sense the presence of information already stored across the terminals X, W, and to prevent that flip flop from receiving any further information. As is well known in accordance with present day techniques, all of these functions may be performed by a flip flop circuit forming part of a miniaturized electronic circuit component, such as is manufactured by Texas Instruments for example, and other manufacturers.

With reference to the flip flops 104 and 106, it will be noted that in this case the Y, Z, terminals are connected directly to the X, W, terminals of the flip flops 98A and 100A, but that the X, W, terminals of the flip flops 104, 106 are connected to their respective relays latches 78 and 82. The V and U terminals are connected directly together with one another and thence to ground through a resistance. It will be noted that the T terminals, that is to say the terminals for receiving the clock pulse for shifting the information from the Y, Z, terminals to the X, W, terminals are all connected with one another in parallel in each bank 72, 74 and 76 as shown, and as shown in FIG. 4A are connected through inverters 108, 110 and 112, and are then connected in parallel to the one shot shift clock pulse generator 92 as shown in FIG. 3B. Thus a single shift clock pulse from the pulse generator 92 will simultaneously trigger all the flip flops in the memory banks 72, 74 and 76 whereby information stored at the Y, Z terminals of any of the flip flops in such memory banks will be directly transferred to the X, W, terminals thereof.

As noted above, the input of information is initiated by means of finger pressure on any one of the buttons 34, 36 or 38, through the double insert disabling logic circuit 64 which will be described below. The information input is then communicated directly, from the respective buttons 34, 36, 38 to their respective memory banks 72, 74, 76, and is then recorded on one only of the five flip flops in any one such memory bank, the selection of the particular flip flop upon which such information is recorded being controlled by the main row select logic circuit 86. As shown in FIG. 4A, the main row select logic circuit 86 will receive information signals through three channels referred to as "hot wax set" "spray wax set," and "no wax set" respectively, and will also receive a reset signals through a fourth channel marked reset.

Thus the hot wax set channel connects directly to a series of five NAND gates referenced 114A to E respectively, the output terminals of which are all connected directly to the information input terminals V of the flip flops 98A to E in the hot wax shift register memory bank 72. The spray wax set channel is connected directly to a similar series of NAND gates 116A to E, the output terminals of which are connected directly to the information input terminals V of the flip flops 100A to E of the spray wax shift register memory bank 74. The no wax set channel is connected directly to a similar series of NAND gates 118A to E, the output terminals of which are connected directly to the information input terminals V of the flip flops 102A to E respectively. The NAND gates 114, 116 and 118 are all of the so-called dual input type, having two input channels and one output channel, such gates being well known in the art. The function of such a NAND gate is to provide a voltage at the output terminal which is positive, when the voltages at the two input terminals are the same, and which becomes negative when the voltage at the two input terminals are different from one another. The purpose of the dual input NAND gates 114, 116 and 118 in each case is to ensure that the information signal concerning either hot wax, spray wax or no wax does not reach a particular flip flop 98, 100 or 102 which is already activated by a previous signal.

This controlling function is achieved by means of a series of triple input NAND gates 120A to E inclusive, and 122A to E inclusive, the gates 120A being connected to the output terminals W of respective flip flops 98, 100 and 102, and the outputs of the gates 120 are inturn connected through a delay 124A to E respectively, and then to an inverter 126A to E, and thence to a dual input NAND gate 128A to E. The output of the gate 128 is connected both an inverter 130A to E and also to the triple input NAND gates 122. The output of the gates 122 A to E is connected to the control terminal U of respective flip flops 98, 100 and 102, and control the flip flop so as to determine whether or not they are capable of receiving an information signal. Note that the remaining two input terminals of the triple input NAND gates 122A to E are connected, with one of the terminals of each of such gates being connected in circuit with one of the inputs of the dual NAND gates 118B to E, and the remaining terminal of the triple input gates 122A to E is connected in circuit with the reset button. In this way, the operation of the reset button is effective to cancel out the most recently received information signal, from its respective group of flip flops 98, 100 and 102, while leaving the information signals on the remaining group of flip flop unchanged.

In order to provide for the controlling and selection of the correct desired signal information pulse, the double insert disabling logic circuit is provided, shown in FIG. 3A as the block 64, and shown in more detail with reference to FIG. 5. As shown in this illustration, the respective hot wax, spray wax, no wax and reset buttons 34, 36, 38 and 40 are each connected on one side to a common circuit, and on the other side to the VCC power circuit, and are connected through respective inverters 132, 134, 136 and 138, which are in turn connected to one of the four input terminals of respective quadruple input NAND gates 140, 142, 144, and 146. It will be noted that the remaining three terminals of each of the quadruple input NAND gates are interconnected with one another. The outputs of the quadruple input NAND gates are connected to respective pulse shapers 66, 68, 70 and 72 (see also FIG. 3A). Each of the pulse shapers 66, to 72 will be seen to comprise two one shot pulse generators referenced as 148A and B, and 150A B, and 152A and B, and 154A and B, respectively. The respective one shot pulse generators 148A, 150A and 152A are connected to their respective hot wax indicator 42, spray wax indicator 44, and no wax indicator 46. In addition, they are also connected to one of the inputs of three out of the four quadruple input NAND gates 140 to 146. Note that in the case of the one shot generator 148A for the hot wax indicator 42, the one shot 148A is connected to the NAND gates 142, 144 and 146, but not to its own NAND gate 140. Similarly, the one shots in the other pulse generators 68, 70 and 72 are connected to each of the NAND gates other than their own.

Each of the one shots 148A, 150A and 152A are also connected to their respective one shots 148B, 150B and 152B, which in turn deliver respective signal information pulses for the hot wax, spray wax, and no wax as shown. The pulse shaper 72, which consists of the one shots 154A and 154B is provided to establish a reset pulse, and is not connected to any indicator light. Thus the one shot 154A is connected directly to the one shot 154B which then provides the reset pulse. Similarly, the one shot 154A is also connected to the three NAND gates 140, 142 and 144, but not to the input of the NAND gate 146.

Figure 6:
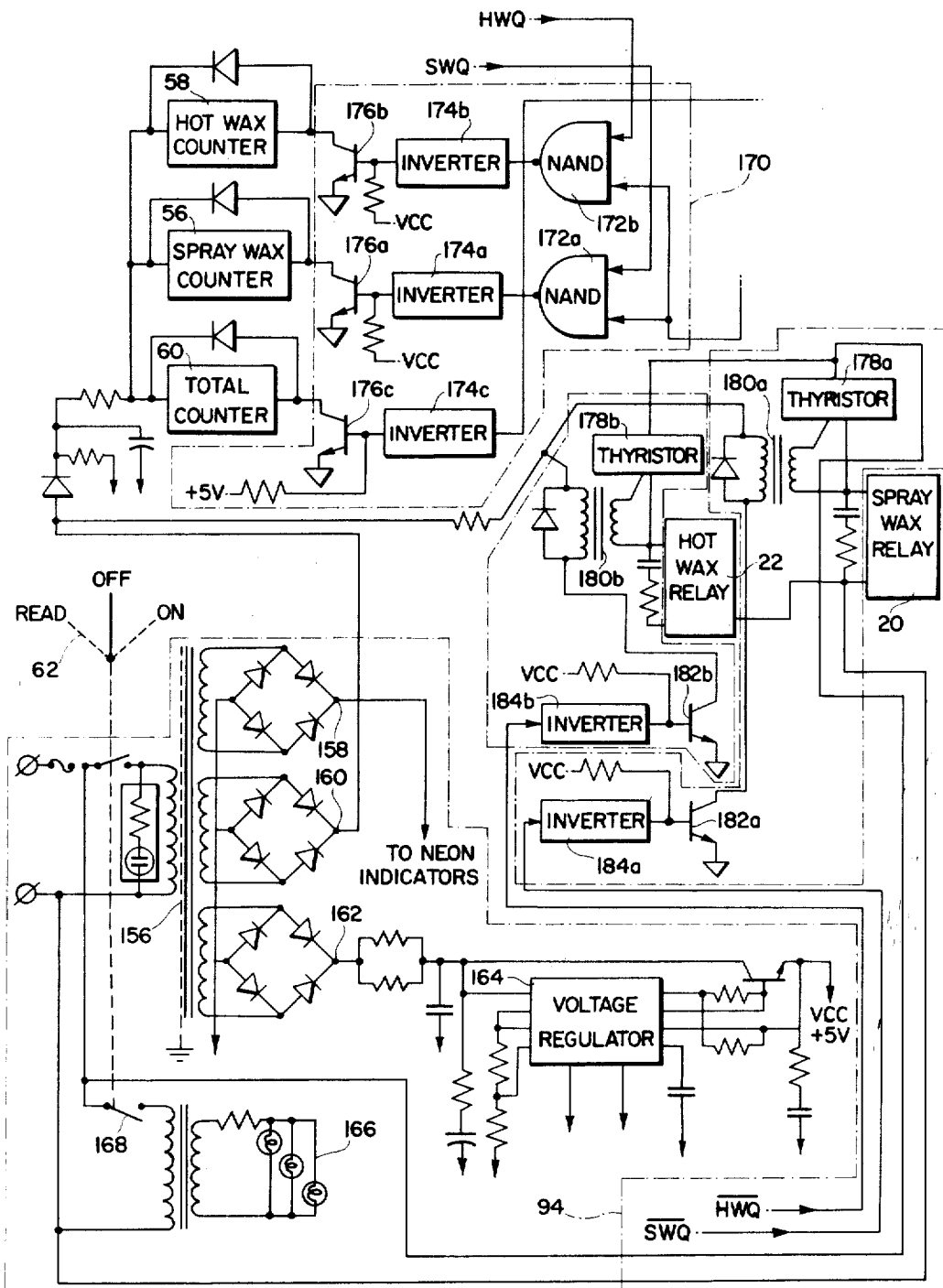

In order to power the counters, and the relays, and also in order to supply voltage to the logic circuits, the voltage regulator power supply 94 is provided, which is shown in more detail in the lower portion of FIG. 6. The power supply comprises a transformer 156 having three outputs namely 158, 160 and 162. The transformer output 158 is connected to the neon lamps (not shown) which provide the illumination for the indicators 42, 44, 46 and 48, 50 and 52. The output 160 provides the power for the counters 58, 56 and 60, and the output 162, controlled by means of the voltage regulator 164 provides the VCC voltage for the logic circuits.

In addition to these three outputs, the main supply, which is controlled by the on/off switch 62 also provides illumination for the counter illumination lamps 166 through the contact breaker 168. The contact breaker 168 is adapted to remain off while the switch is moved to the on position, and to close when the switch 62 is moved to the read position, thereby providing for security of the information contained on the counters which will remain invisible until they are illuminated in this manner.

In order to operate the counters 56, 58 and 60, the counter drive circuits are provided, illustrated in the box 170. The counter drives for the hot wax and spray wax counters 56 and 58 will be seen to comprise respective dual input NAND gates 172A and B, connected on their outputs to respective inverters 174A and B which are in turn connected to transistors 176A and B.

Figure 4B:
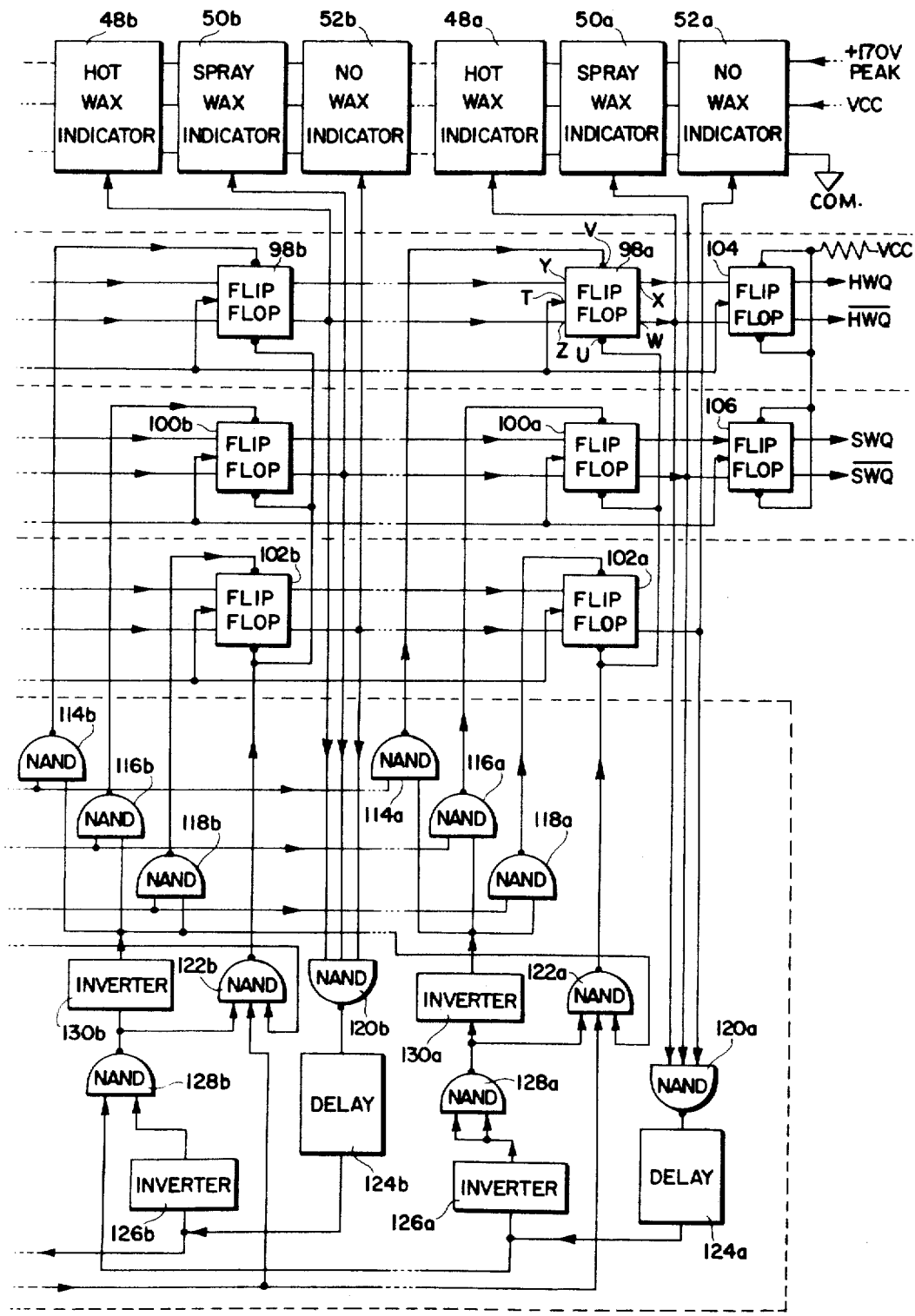
Figure 5:
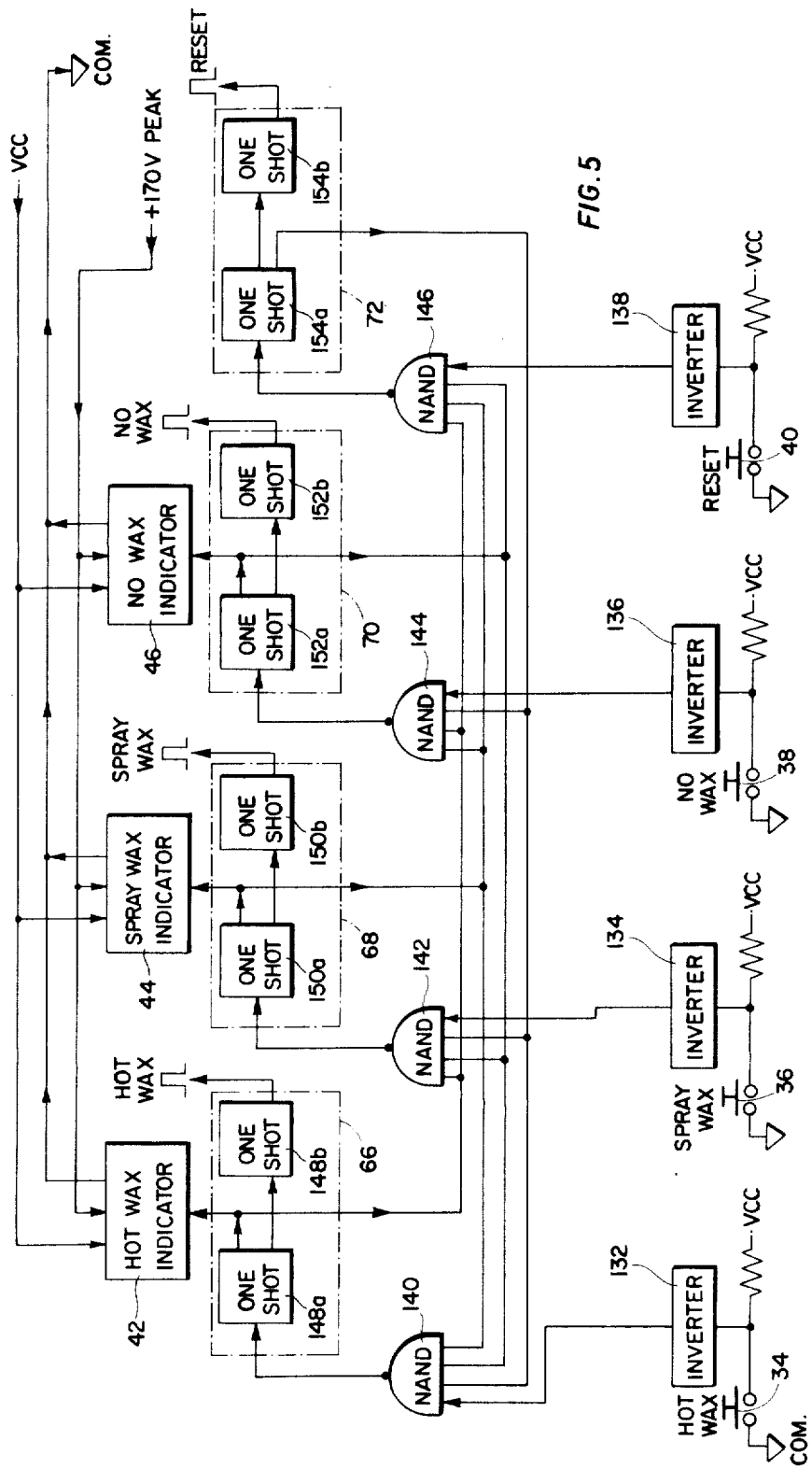
FIG. 5 shows the circuit diagram of the double insert disabling logic, for controlling and selecting the information signal pulses, and, FIG. 6 shows the circuit diagram of the voltage regulator power supply and drive circuits for the counters and relays and the main switching circuits.

The inputs of the respective NAND gates are connected to the SWQ and HWQ connections shown in FIG. 4B.

The total wax counter is connected simply through an inverter 174C and a transistor 176C, and will thus be operated either by a hot wax signal or a spray signal, and thereby provide a total count.

The hot wax and spray relay coils 20 and 22, which require the main voltage direct are controlled by means of respective thyristors 178A and B, which are connected directly to the main supply, and which are connected at their outputs directly to their respective relays 20 and 22. The thyristors 178 are controlled by means of the transformers 180A and B, which are in turn connected through transistors 182A and B and inverters 184A and B to the SWQ and HWQ minus terminals as shown in FIG. 4B.

In operation, assuming that no information has yet been recorded, the operator will switch on the switch 62 to the on position, and when the first car arrives at the car wash station will press the button for the appropriate selection by the driver, for example, the hot wax button 34.

Operation of button 34 will thus produce a pulse which will illuminate the hot wax indicator 42 and will also provide a pulse simultaneously to the main row select logic circuits 86 illustrated in FIGS. 4A and B. The hot wax signal will be communicated to all of the NAND gates 114A to E. Since at this time there is no information stored on any of the flip flops, the output of the NAND gates 114A will therefore become positive, and will deliver a signal to the terminal B to the flip flop 98A, which is immediately communicated to the X terminal of the flip flop 98A and therefore to the Y terminal of the next adjacent flip flop 104, where the signal will remain, until the particular automobile reaches the micro-switch 30 which is located at an appropriate point in the car wash, adjacent to the operation of the spray wax and hot wax units. Operation of the microswitch 30, will operate the one shot shift clock 92, which then delivers a shift clock pulse to the T terminals of all the flip flops, and causes transmission of signals stored at the Y terminal for example, to be transmitted to the X terminal of the same flip flop. As soon as the signal stored at the Y terminal of the flip flop 104 is transmitted to the X terminal, it will then deliver a triggering signal to the appropriate NAND gate 172A of the spray wax counter drive, and simultaneously to the inverter 184A which will then cause operation of the spray wax relay 20, which in turn will operate the appropriate solenoid 60, causing delivery of the appropriate wax onto the car.

During the progression of the first car through the car wash, it is assumed that other cars will arrive, and other information will be recorded which will accumulate on the appropriate one of the flip flops 98B to E, 100B to E and 102B to E, depending upon which button is pressed for each car.

As the first car passes over the micro-switch 30 and produces the shift clock pulse, all of the information stored in this manner on all of the flip flops A to E is simultaneously moved up to the next flip flop in line, ie.

from B to A, and from C to B and so on to ensure that the appropriate hot wax, spray wax or no wax treatment is administered to the appropriate car.

In the event that the wrong information is recorded for some reason, or for example, a customer decides to change his mind then the operator simply has to press the reset button which will then cancel out the information stored on the last bank of flip flop carrying information. Thus if the information is stored on flip flop A, B and C, but the flip flops D are blank then pressing of the reset button will cancel out the information button stored on the flip flop C. The operator can then press the appropriate button for the new selection.

As stated above, operation of the appropriate hot wax or spray wax relay will also produce operation of the hot wax or spray wax counter 56 or 58 and at the same time operation of the total counter 60 thereby recording the total number of cars through the car wash at any given time, and the break down of the appropriate type of wash or wax treatment which was administered. In this way, the owner of the car wash can at all times make a careful check of the operations that are being performed.

The foregoing is a description of a preferred embodiment of the invention which is given here by way of example. The invention is not to be taken as limited to any of the specific features as described but comprehends all such variations thereof as come within the scope of the appended claims.

What I claim is:

1. A process control programmer for use in the programming of selective process controls for selecting different processing options such as for example, process controls employed in car wash installations of the type equipped to both wash cars, and apply either a spray wax treatment, or the like, said programmer comprising;

manually operable process selector signal generating means for respective said processing operations;

terminal logic circuit means for respective said process options responsive to a process selection signal from said signal generating means, to record a first process option selected as aforesaid;

at least one preceding logic circuit means for respective said process options responsive to a further process selection signal from a said signal generating means, to record the selection of a subsequent process option;

selective process operating circuit means responsive to a signal from said terminal logic circuit means to initiate a selective process operation in response thereto;

transfer circuit means communicating between respective said terminal logic circuit means and respective said preceding logic circuit means, whereby to transmit a process selection signal from said preceding logic circuit means to respective said terminal logic circuit means, and, movement responsive signal generating means, activated by movement of an article relative thereto, and connected to said terminal logic circuit means whereby to procure communication of a first said process selection on said terminal logic circuit means to said selective process operating means, and to procure communication of said second process selection signal from said preceding logic circuit means to said terminal logic circuit means as aforesaid.

2. A programmer as claimed in claim 1 including reset circuit means connected to said terminal logic circuit means, and to said preceding logic circuit means and operable to cancel out the selection of a process option therefrom.

3. A programmer as claimed in claim 1 wherein said terminal logic circuit means comprise a group of flip flop circuits and wherein each said preceding logic circuit means comprise separate groups of flip flop circuits each said group of flip flops comprising a separate flip flop circuit for each said process option that is available for selection.

4. A programmer as claimed in claim 3 including a plurality of further said preceding logic circuit means, arranged in sequence and respective transfer circuit means therefore, connecting same in sequence with said first mentioned preceding logic circuit means, each comprising a further group of said flip flop circuits, to record the selection of further subsequent process options thereon.

5. A programmer as claimed in claim 3 including row selection circuit means connected between said process selector signal generating means, and said terminal and said preceding logic circuit means, operable to select a particular group of said flip flops upon which a particular signal shall be recorded.

6. A programmer as claimed in claim 1 including visual selection indicator means connected to respective logic circuit means, and responsive to recordal of a process selection signal thereon, to provide visual indication of said selection.

7. A programmer as claimed in claim 1 including counter means connected in circuit with said process operating circuit means, and responsive to operation thereof to record the total number of each said process options which are selected during any one particular period.

8. A programmer as claimed in claim 1 including circuit disabling means connected between all said manually operable process selector signal generating means and responsive to operation of one said signal generating means to disable all the other said signal generating means to prevent inadvertent operation thereof.

9. A programmer as claimed in claim 3 including shift signal generating means connected to said groups of flip flops and responsive to operation of said movement responsive signal generating means to provide a shift signal pulse for triggering transfer of said process information signal recorded on a flip flop in one said group of flip flops to a corresponding flip flop in a next said group in sequence.

10. A programmer as claimed in claim 7 wherein said counter means includes numerical counter indicators, which are normally invisible, and including light means therefore, and switch means connected thereto, operable to illuminate said counter means to permit reading thereof.

11. A programmer as claimed in claim 1 wherein said programmer is part of a car wash control installation, and wherein said process options include different car cleaning and treatment operations such as a spray wax treatment, a hot wax treatment, and no wax treatment at all, and wherein said movement responsive signal generating means is a switch operable by movement of a car relative thereto in said car wash installation.

* * * * *